United States Patent
Burritt et al.

(10) Patent No.: US 7,480,376 B2
(45) Date of Patent: *Jan. 20, 2009

(54) APPARATUS AND METHOD FOR PROVIDING CALL STATUS INFORMATION

(75) Inventors: David Ray Burritt, Broomfield, CO (US); Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 1056 days.

This patent is subject to a terminal disclaimer.

(21) Appl. No.: 10/406,341

(22) Filed: Apr. 3, 2003

(65) Prior Publication Data

US 2004/0057422 A1    Mar. 25, 2004

Related U.S. Application Data

(63) Continuation-in-part of application No. 10/251,249, filed on Sep. 20, 2002.

(51) Int. Cl.
H04M 1/02 (2006.01)
(52) U.S. Cl. .................. 379/355.02; 370/352; 375/341; 379/93.17; 379/111; 379/428.01; 379/433.06; 455/420
(58) Field of Classification Search .................. 370/352; 379/52, 88.14, 257, 201.01, 88.13, 93.17, 379/111, 355.02, 428.01, 433.06; 375/341; 455/420
See application file for complete search history.

(56) References Cited

U.S. PATENT DOCUMENTS

| | | |
|---|---|---|
| 4,748,656 A | 5/1988 | Gibbs et al. |
| 5,220,674 A | 6/1993 | Morgan et al. |
| 5,548,729 A | 8/1996 | Akiyoshi et al. |
| 5,724,407 A * | 3/1998 | Bruno et al. ............ 379/88.13 |
| 6,192,341 B1 | 2/2001 | Becker et al. |
| 6,421,425 B1 | 7/2002 | Bossi et al. |
| 6,661,779 B2 | 12/2003 | Johnson et al. |
| 6,665,375 B1 | 12/2003 | Forlenza et al. |
| 6,772,210 B1 | 8/2004 | Edholm |
| 6,950,501 B1 | 9/2005 | Chaturvedi et al. |
| 6,975,712 B1 | 12/2005 | Schnarel et al. |
| 7,197,120 B2 * | 3/2007 | Luehrig et al. ........... 379/88.14 |
| 2002/0057765 A1 | 5/2002 | Hyzlak et al. |
| 2002/0090980 A1 | 7/2002 | Wilcox et al. |
| 2002/0159574 A1 | 10/2002 | Stogel |
| 2003/0005076 A1 * | 1/2003 | Koch et al. ................... 370/352 |
| 2003/0056003 A1 | 3/2003 | Nakatani |
| 2003/0194080 A1 * | 10/2003 | Michaelis et al. ........... 379/257 |
| 2003/0214519 A1 | 11/2003 | Smith et al. |
| 2005/0094776 A1 | 5/2005 | Smith et al. |
| 2005/0163316 A1 | 7/2005 | Wing |
| 2005/0201542 A1 * | 9/2005 | Wengrovitz ............ 379/201.01 |

OTHER PUBLICATIONS

U.S. Appl. No. 10/251,249, filed Sep. 20, 2002, David R. Burritt.

* cited by examiner

Primary Examiner—Gerald Gauthier
(74) Attorney, Agent, or Firm—John C. Moran

(57) ABSTRACT

An apparatus and method use logical network connections to telephones interconnected by the network to obtain the status of station-specific telephony function information and then to convert the status of station-specific telephony function information to audio information that is presented to the user.

22 Claims, 8 Drawing Sheets

APPARATUS AND METHOD FOR PROVIDING CALL STATUS INFORMATION

CROSS REFERENCE TO RELATED APPLICATIONS

This patent application is a Continuation In Part of U.S. patent application Ser. No. 10/251,249, filed on Sep. 20, 2002, and assigned to the same assignee as the present application. U.S. patent application Ser. No. 10/251,249 is hereby incorporated by reference.

TECHNICAL FIELD

This invention relates to telecommunication switching systems, and in particular, to the provision of call status information.

BACKGROUND OF THE INVENTION

Within the prior art, it is well known to convert visual status of station-specific telephony functions (here after referred to as call status information) to audio information so that visually impaired people can receive the call status information. Station-specific telephony functions include but are not limited to the following: call operations, telephony terminal states, messaging systems' information for a telephony terminal, etc. The prior art has provided the audio information for call status information by utilizing special hardware to perform voice synthesis. This hardware was designed specifically for visually impaired users, and consequently, was expensive. In addition, the use as special hardware limited the visually impaired users to a few specific telecommunication terminals.

In addition, the use of specialized equipment resulted in the fact that the users of this equipment were given little if any ability to determine when the audio call status information would be presented and at what frequency. Whereas, the specialized equipment could be modified via programming to provide custom features for individual users; the cost of such provisioning was prohibitive plus the delay normally would be in terms of many months for such customization to be performed by the manufacturer.

SUMMARY OF THE INVENTION

The aforementioned are solved and a technical advance is achieved in the art by an apparatus and method that uses logical network connections to telephones interconnected by the network to obtain the call status information and then to convert the call status information to audio information that is presented to the user.

DETAILED DESCRIPTION

Figure 1:
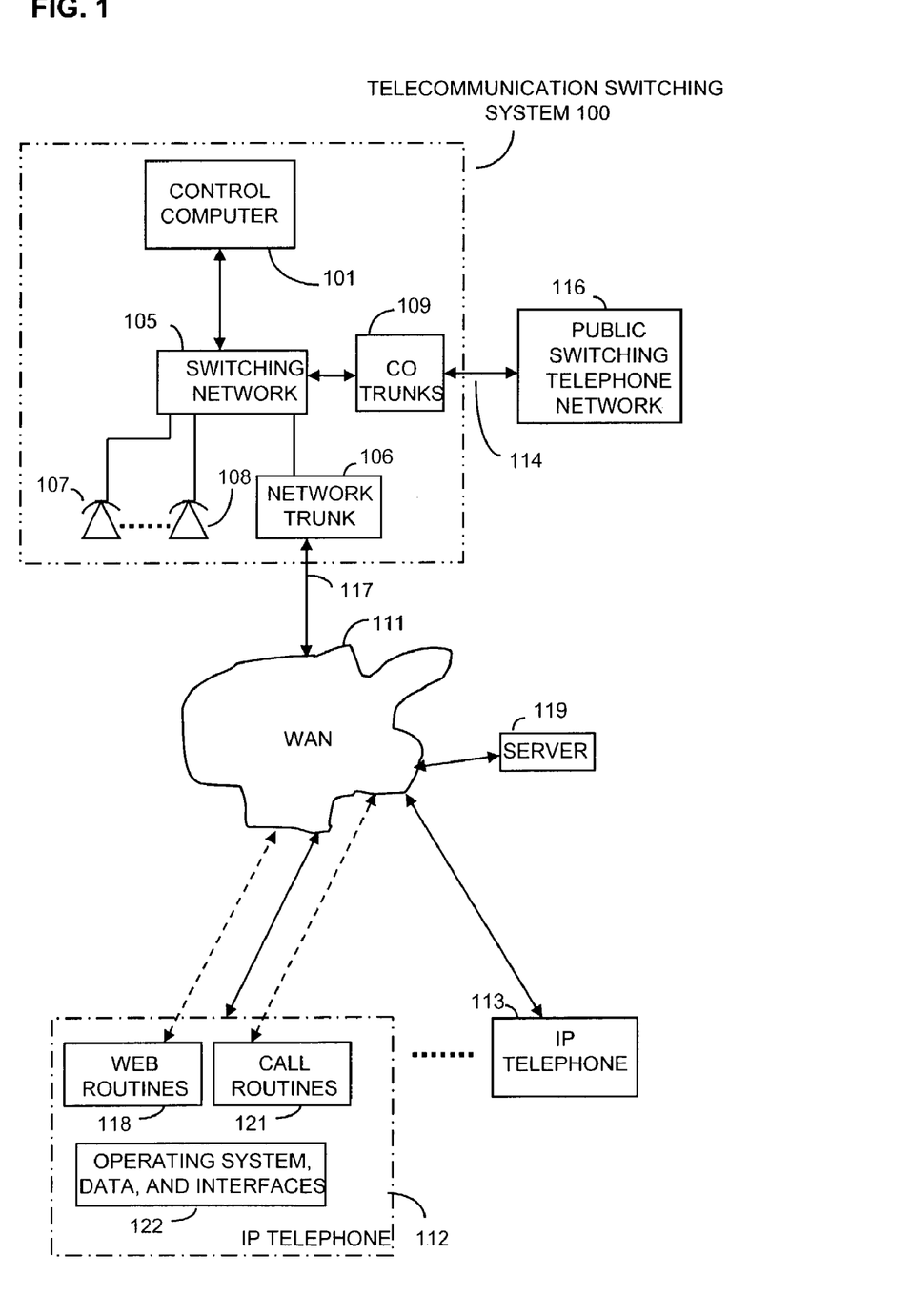
FIG. 1 illustrates, in block diagram form, an embodiment for implementing the invention.

FIG. 1 illustrates an embodiment for implementing the invention. In FIG. 1, control computer 101 performs the overall control functions for conventional telephones 107-108 and IP telephone sets 112-113. IP telephone sets 112-113 may be IP telephone set 4624 manufactured by Avaya Inc. or a similar telephone set. Switching network 105 performs the switching of not only audio information but also control information to and from computer 101 to the telephone sets. Computer 101 is interconnected to wide area network (WAN) 111 via network trunk 106. Control computer 101 controls the activity of IP telephone sets 112-113 by the transmission of call status information and the receipt of call status information from the IP telephone sets via WAN 111. Control computer 101 controls telephones 107-108 by the transmission of call status and reception of control information via switching network 105. Telephone sets 107-108 can be analog telephone sets, ISDN telephone sets, or proprietary digital protocol telephones sets. IP telephone 112 as is illustrated as having three major software components. Web routines 118 include the web browser plus the programs that are downloaded from server 119 whose function will be described later. Call routines 121 perform the traditional call control that an IP telephone normally does. Operating systems, data, and interfaces block 122 perform those functions as listed. Consider now how web routines 118 are utilized to provide the audio information representing the visual call status signals of IP telephone 112. As will be described in greater detail, the web browser of web routines 118 accesses server 119 to receive the routines for implementing the invention via WAN 111. Telecommunication switching system 100 is connected to public switching network 116 via CO trunks 109 and trunks 114.

Figure 2:
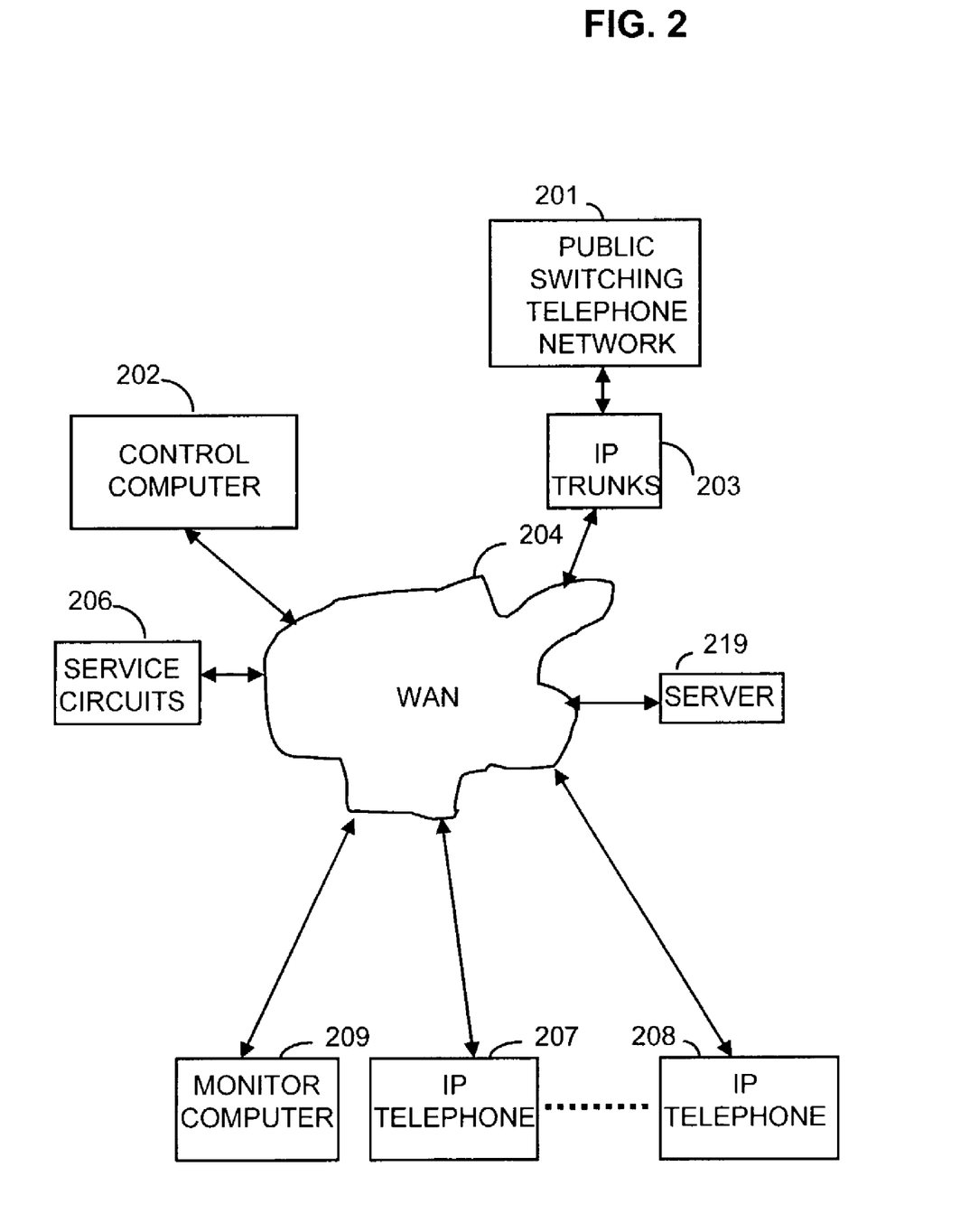
FIG. 2 illustrates, in block diagram form, an embodiment for implementing the invention.

FIG. 2 illustrates another embodiment for implementing the invention. Control computer 202 is controlling the operations of IP telephone sets 207-208 with respect to telecommunication operations by the transmission and reception of control information via WAN 204. Service circuits 206 under the control of control computer 202 provide tone generation, conferencing, etc. via WAN 204 to IP telephone sets 207-208. For a telecommunication call which is only between two IP telephone sets, the IP telephone sets communicate via WAN 204 for the transmission of audio information. Public switching network 201 is interconnected to WAN 204 via IP trunk 203. Web routines 209 and server 219 perform similar functions to those performed by web routines 118 and server 119 of FIG. 1.

The only software that must be pre-installed in web routines 118 is a web browser. When the user of IP telephone 112 wishes to perform the audio call status operations, the user first causes the built-in web browser of IP telephone set 112 to access server 119 and obtain from server 119 a JAVA applet or its equivalent Microsoft Active X control entity. The JAVA applet is a JAVA program that will be installed within web routines 118 that will perform the operations of establishing a first socket to call routines 124 in order to obtain the call status information and, to establish a second socket so that the audio call status information can be presented to the user via the call routines 121. An operation where a device starts out with only a browser and downloads a JAVA applet to execute certain functions and relies on other programs already installed is commonly referred to as a "thin client" implementation by those skilled in the art. The JAVA applet will also contain the necessary routines to convert call status information to audio information for reproduction by the IP telephone via call routines 121.

To perform its operations, WEB routines 118 needs obtain the IP address for IP telephone set 112 from call routines 121. Both WEB routines 118 and call routines 121 via operating system, data, and interfaces 122 establish independent paths through WAN 111 as is illustrated by the dashed lines between IP telephone 112 and WAN 111. One method to obtain the IP address is for WEB routines 118 to broadcast the telephone number and the password which may be encrypted for IP telephone set 112, along with a request for the corresponding IP address via WAN 111 to all of the IP telephone sets 112-113. Call routines 121 of IP telephone set 112 are responsive to this request to transmit the IP address to WEB routines 118. In addition, WEB routines 118 could obtain the IP address for IP telephone set 112 by accessing server 119 and obtaining the IP address from server 119 in one embodiment of the invention.

Utilizing the IP address, WEB routines 118 contacts call routines 121 and opens a socket in the TCP/IP control structure used by call routines 121 that allows WEB routines 118 to receive the control status information being transmitted from computer 101 via network trunk 106 and WAN 111 to call routines 121 of IP telephone set 112. In one embodiment of the invention, WEB routines 118 is responsive to the call status information being transmitted to call routines 121 which will cause different indicators to be lit on IP telephone set 112 to convert this call status information into audio information that WEB routines 118 presents to the user via a speaker or handset attached to IP telephone 112 via call routines 121.

The advantage of the embodiment just described for presenting audio call status information is quite clear. First, no changes must be made physically to IP telephone set 112 nor does the program of control computer 101 have to be modified in any manner.

WEB routines 118 transmits the audio call status information to IP telephone set 112 via WAN 111 for presentation to the user. This is accomplished by WEB routines 118 opening a second socket on call routines 121 of IP telephone set 112 by a request which call routines 121 recognizes as being for a socket through which it will receive audio information. WEB routines 118 is responsive to the call status information being transmitted to IP telephone set 112, to convert the call status information to audio call status information, and to transmit this audio call status information via the second socket to call routines 121. In response to the audio call status information from WEB routines 118, call routines 121 presents this information to the user via the internal CODEC of call routines 121. The output of the CODEC presents the audio call status information to the user in the same audio stream as is being utilized for the actual telecommunication call. The audio stream may be presented in the following manner. While the call is in-progress, the audio information may be provided through a mechanism known to those skilled in the art, commonly referred to as a "whisper" function in which the audio information is provided to the subscriber in a manner that cannot be heard by others on the call. Alternatively, IP telephone set 112 could utilize a built-in speaker such as one used in a speaker phone to present this information. Alternately, as is well known to those skilled in the art, call routines 121 could also convert the received audio call status information to information to be presented to the user using another conversion technique rather than that used by its CODEC.

The previous embodiments described for FIG. 1 can be implemented on the system illustrated in FIG. 2.

Figure 3:
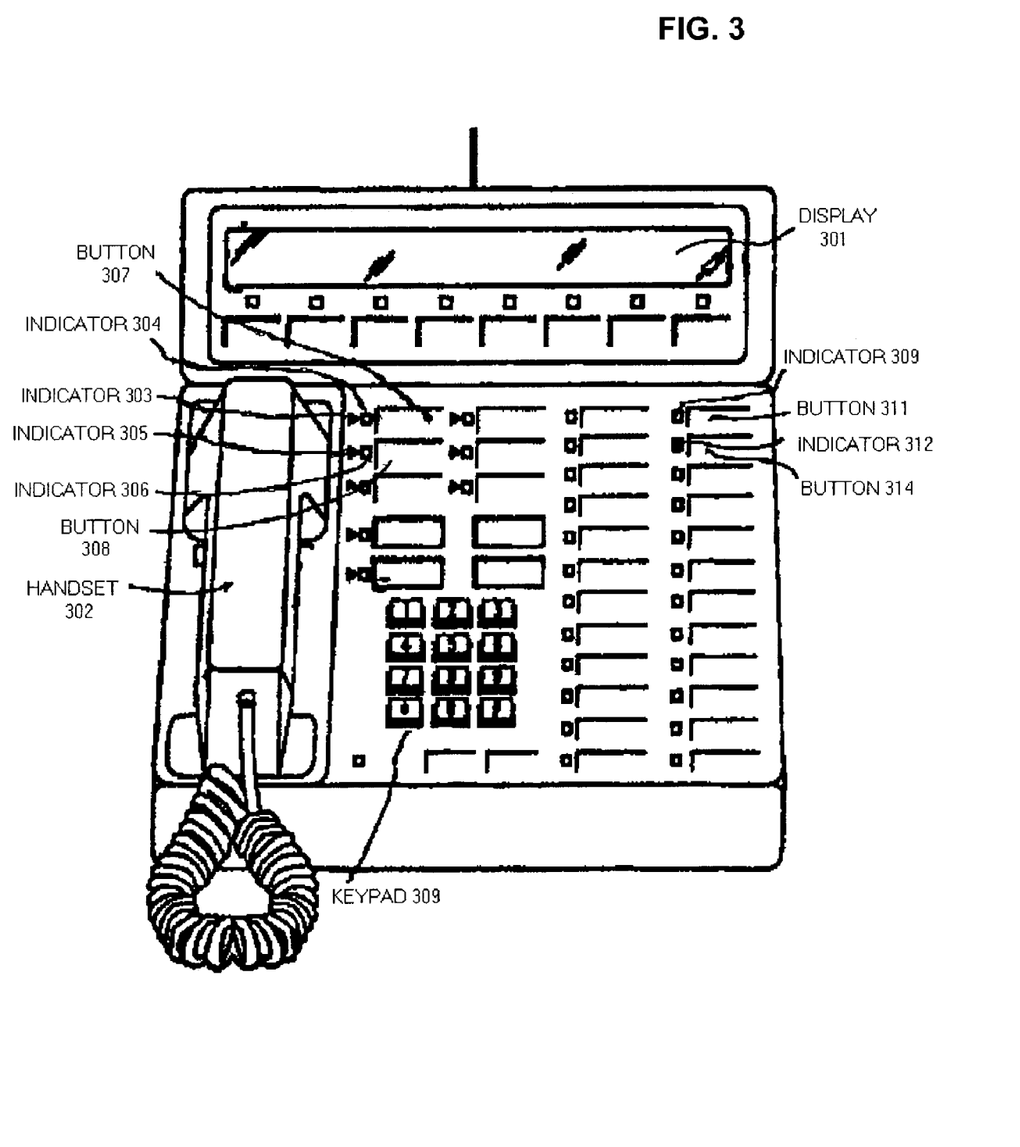
FIG. 3 illustrates, in pictorial form, an embodiment of an IP telephone set.

FIG. 3 illustrates an embodiment of IP telephone set 112. The user of IP telephone set 112 speaks and listens through handset 302. Although not illustrated in FIG. 3, IP telephone set 112 also has a speaker and microphone for conference calls. Display 301 is utilized to display the telephone number being dialed by keypad 309 during the placement of an outgoing call and displays the name and telephone number of the calling party for an incoming call. IP telephone set 112 has a number of telephone lines that could be selected with each line being denoted by a pair of indicators and a button. For example, indicators 303 and 304 and button 307 indicate line 1. Indicators 305 and 306 and button 308 indicate line 2. If the user is active on line 1, indicator 304 will be on as well as indicator 303. If the user has a caller on hold on line 2, indicator 305 will flash. The user of IP telephone set 112 selects line 1 by activating button 307. Similarly, the user activates line 2 by activating button 308.

Pairs of indicators and buttons, such as indicator 309 and button 311, may be used for activating a variety of operations. One is to automatically dial a party that had been preprogrammed by the user or to activate a feature such as using the conference facilities of IP telephone set 112. If button 311 is activated, indicator 309 will turn on. Indicator 312 and button 314 have similar functions. In general, there would be a number of such combinations of indicators and buttons as illustrated by 309, 311, 312, and 314. All button activation information is transmitted to control computer 101, and control computer 101 controls the state of the indicators.

Figure 4:
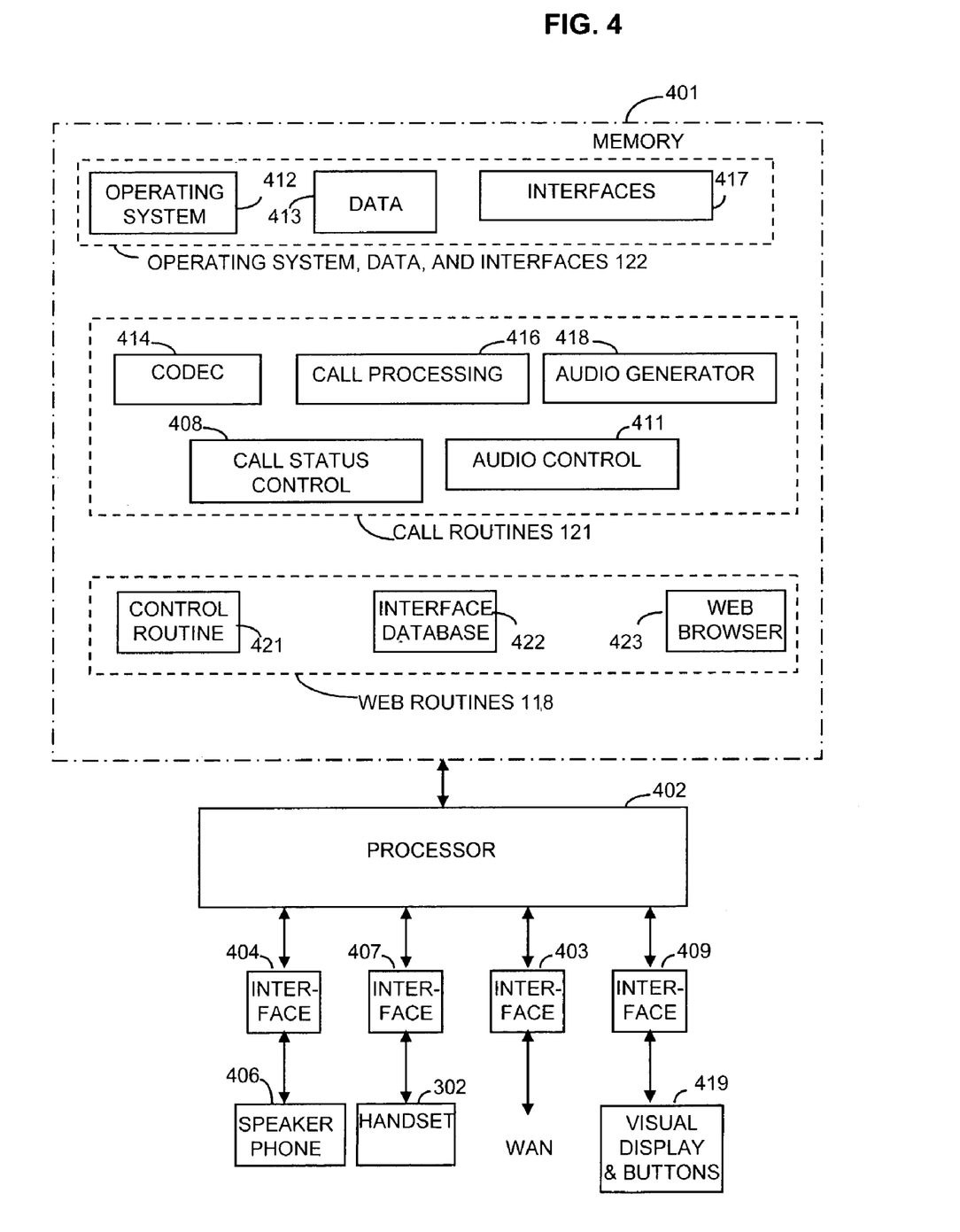
FIG. 4 illustrates, in block diagram form, an embodiment of an IP telephone set.

FIG. 4 illustrates, in block diagram form, one embodiment of IP telephone set 112. Processor 402 provides the overall control for the functions of IP telephone set 112 by executing programs and storing and retrieving data from memory 401. Processor 402 connects to WAN 111 or 204 via interface 403. Processor 402 interfaces to handset 302 via interface 407 and connects to visual display and buttons 419 via interface 409. Visual display and buttons 419 is all of the indicators, buttons, keypad, and display illustrated in FIG. 3. Processor 402 performs the operations of IP telephone set 112 by executing the call routines 121 illustrated in memory 401. In operating system, data, and interfaces 122, operating system 412 provides the overall control and the necessary protocol operations. Operating system routine 412 provides all control functions required to implement the TCP/IP protocol as is well known to those skilled in the art. Data is stored in data block 413. The communication and control of the various interfaces illustrated in FIG. 4 is provided by interfaces routine 417.

In call routines 121, overall control of the call processing is performed by IP telephone set 112 under control of call processing routines 416. CODEC 414 encodes and decodes the audio information for communication with handset 302 or conference speaker and microphone 406 for communication with WAN 111 or 204. Audio generator 418 implements other software methods for reproducing sounds for utilization within the invention. Call status control routine 408 terminates the socket that is established by control routine 421 of web routines 118 to receive the call status information as described in the previous examples. Operating system 412 is responsive to messages from control routine 421 to establish a socket that will allow control routine 421 to establish this socket with call status control routine 408 of call routines 121. Operating system 412 operates independently to establish the socket from control routine 421 and call status control 408 via WAN 111 or 204. When control routine 421 opens a socket to call status control 408, control routine 421 uses the IP address of IP telephone set 112 to transmit a message to a TCP/IP port on IP telephone set 112 that is associated with call status routine 408. Operating system 412 is responsive to this message received from the WAN to establish a socket for control routine 421 to receive call status information concerning IP telephone set 112 from call status control 408. This socket interconnects control routine 421 and call status control routine 408. The operating system of IP telephone set 112 then directs future messages for the port from control routine 421 to this socket from which the messages are transferred to call status control routine 408. Similarly, messages from call status control routine 408 to the socket are transmitted to control routine 421. Call status control routine 408 receives information from call processing routine 416 concerning control information received via WAN 111 to update indicators or display 301 of visual display and buttons 419. Similarly, call status control 408 receives actuation information for buttons or keypad of block 419 from call processing routine 416. Call status control 418 transmits this call status information to control routine 421 via WAN 111.

Audio control routine 411 terminates a second socket that was described as being set up with control routine 421 of web routines 118 so that the audio call status information being received from control routine 421 can be reproduced as the audio call status information. When control routine 421 opens the second socket, it uses the IP address of IP telephone 112 to transmit a message to another TCP/IP port that is associated with audio control routine 411. Operating system 412 is responsive to this message to establish a socket for control routine 421 to transmit information to audio control routine 411. Operating system 412 then directs future messages for the port from control routine 421 to this other socket from which the messages are transferred to audio control routine 411. Similarly, messages from audio control routine 411 to the other socket are transmitted to control routine 421. The speaker of unit 406 or the receiver of handset 302 can be utilized for this reproduction of the call status information. Audio control 411 can utilize CODEC routine 414 to reproduce this audio call status information or audio generator routine 418. The audio information is transferred via the appropriate handset to either the speaker or receiver.

In web routines 118, overall control is performed by control routine 421. Interface database 422 stores preference and options that define the user interface. Web browser 423 is a reduced web browser that is capable of accessing server 119 to obtain the control routine 421 and interface database 422. Web browser 423 can be actuated to perform the accessing for these various routines from server 119 by actuation of a button on the IP telephone.

Figure 5:
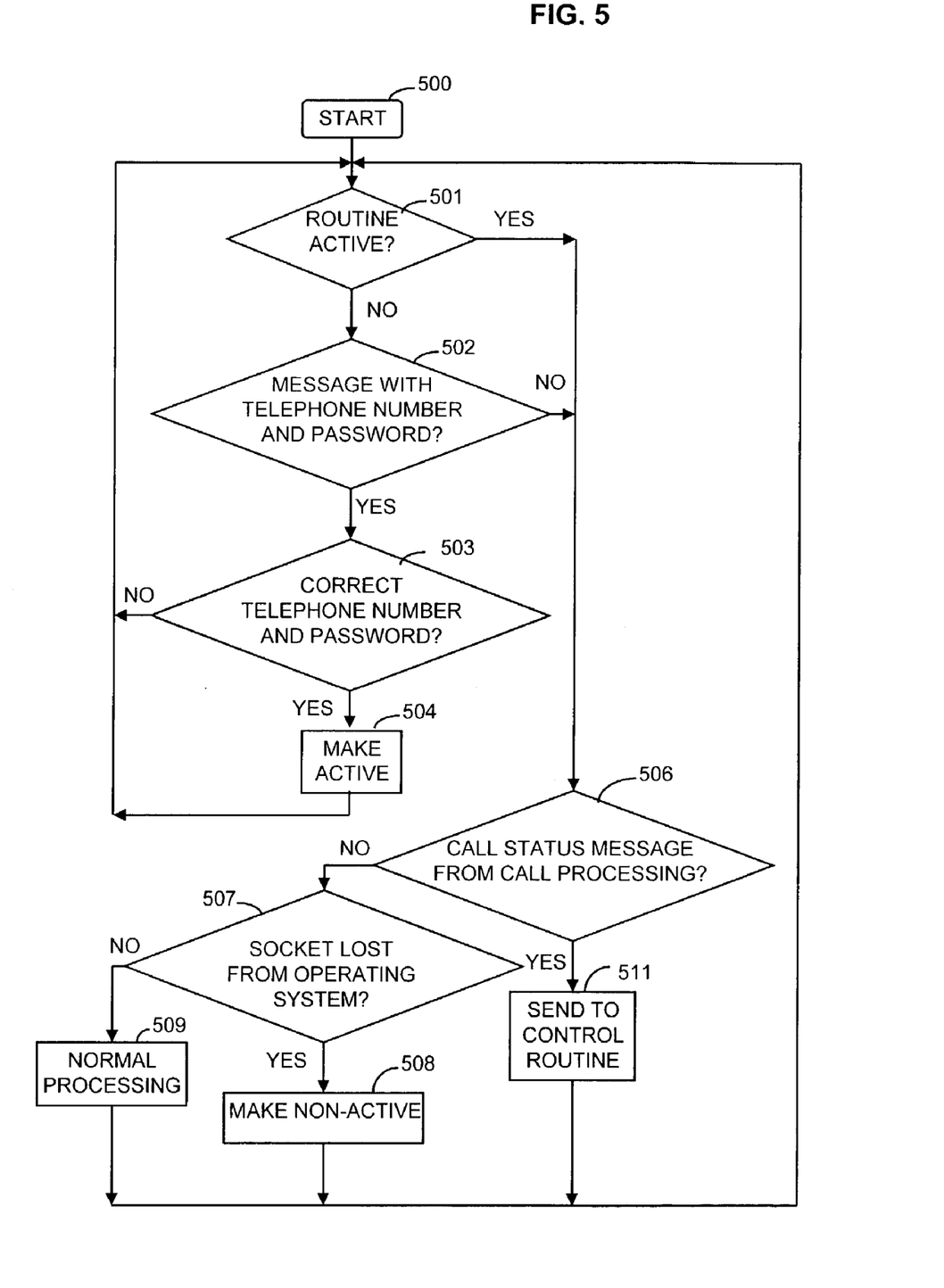
FIG. 5 illustrates, in flow chart form, operations performed by an embodiment of a call status control routine.

FIG. 5 illustrates, in flowchart form, operations performed by an embodiment of a call status control routine such as call status control routine 408 of FIG. 4. After being started in block 500, decision block 501 determines if the routine is active with respect to receiving call status information for an IP telephone set. Active in this case means that there is a socket set up to an IP telephone set by the operating system. If the answer is no, decision block 502 determines if there is a message containing a telephone number and password of an IP telephone set. This indicates that a control routine is attempting to establish communication with a call status control routine. If the answer is yes, decision block 503 determines if the telephone number and password for this particular IP telephone set has been received. If the answer is no, control is transferred back to decision block 501. If the answer is yes, block 504 makes the state active and sends a message to the operating system to establish the socket with the call status control routine. Note, that one skilled in the art could readily envision that blocks 501-504 could be performed within the operating system or some other routine.

If the answer is yes in decision block 501 or no in decision block 502, control is transferred to decision block 506. Decision block 506 determines if there is a call status message from the call processing routine. If the answer is no, control is transferred to decision block 507 which determines if communication has been lost with the control routine. The operating system would normally detect this loss of communication and inform the call status control routine in a manner well known to those skilled in the art. If the answer is no in decision block 507, control is transferred to block 509 which performs normal processing before returning control back to decision block 501. If the answer in decision block 507 is yes, control is transferred to block 508 which sets the state to non-active before returning control back to decision block 501.

Returning to decision block 506. If a call status message has been received from the call processing routine, block 511 transmits this message to the control routine before transferring control back to decision block 501.

Figure 6:
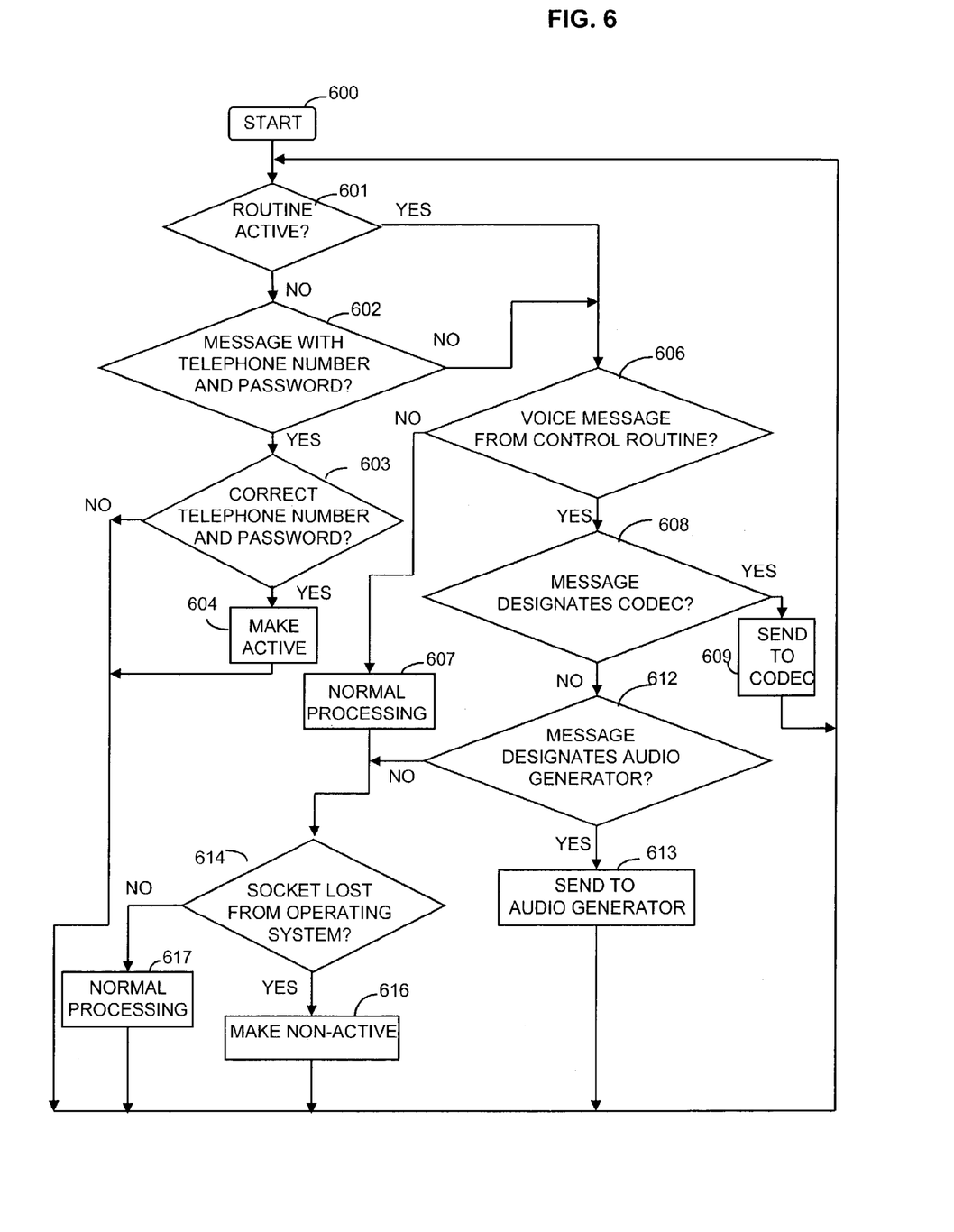
FIG. 6 illustrates, in flow chart form, operations performed by an embodiment of an audio control routine.

FIG. 6 illustrates, in flowchart form, operations performed by one embodiment of an audio control routine such as audio control routine 411 of FIG. 4. After being started in block 600, decision block 601 determines if the routine is active with respect to receiving call status information from an IP telephone set. Active in this case means that there is a socket set up to an IP telephone set by the operating system. If the answer is no, decision block 602 determines if there is a message containing a telephone number and password of an IP telephone set. This indicates that a control routine is attempting to establish communication with a call status control routine. If the answer is yes, decision block 603 determines if the telephone number and password for this particular IP telephone set has been received. If the answer is no, control is transferred back to decision block 601. If the answer is yes, block 604 makes the state active and sends a message to the operating system to establish the socket with the audio control routine. Note, that one skilled in the art could readily envision that blocks 601-604 could be performed within the operating system or some other routine.

If the answer is yes in decision block 601 or no in decision block 602, control is transferred to decision block 606. The latter decision block determines if a voice message has been received from the control routine. If the answer is no, control is transferred to block 614 whose operations are described below. If the answer in decision block 606 is yes, decision block 608 determines if the voice message designates that the CODEC routine should be utilized to present the message to the user. If the answer is yes in decision block 608, the message is sent to the CODEC routine by block 609. Note, if the message is sent to the CODEC then the message will be played in the receiver of the IP telephone set that is currently being utilized by the user.

Returning to decision block 608. If the answer is no, decision block 612 determines if the message designates that the audio generator routine is to be used to present the message to the user. If the answer is yes, block 613 transmits the voice message to the audio generator routine before transferring control back to decision block 601.

Returning to decision block 612, if the answer is no, control is transferred to decision block 614 which determines if communication has been lost with the control routine. The operating system would normally detect this loss of communication and inform the call status control routine in a manner well known to those skilled in the art. If the answer is no in decision block 614, control is transferred to block 617 which performs normal processing before returning control back to decision block 601. If the answer in decision block 614 is yes, control is transferred to block 616 which sets the state to non-active before returning control back to decision block 601.

Figure 7:
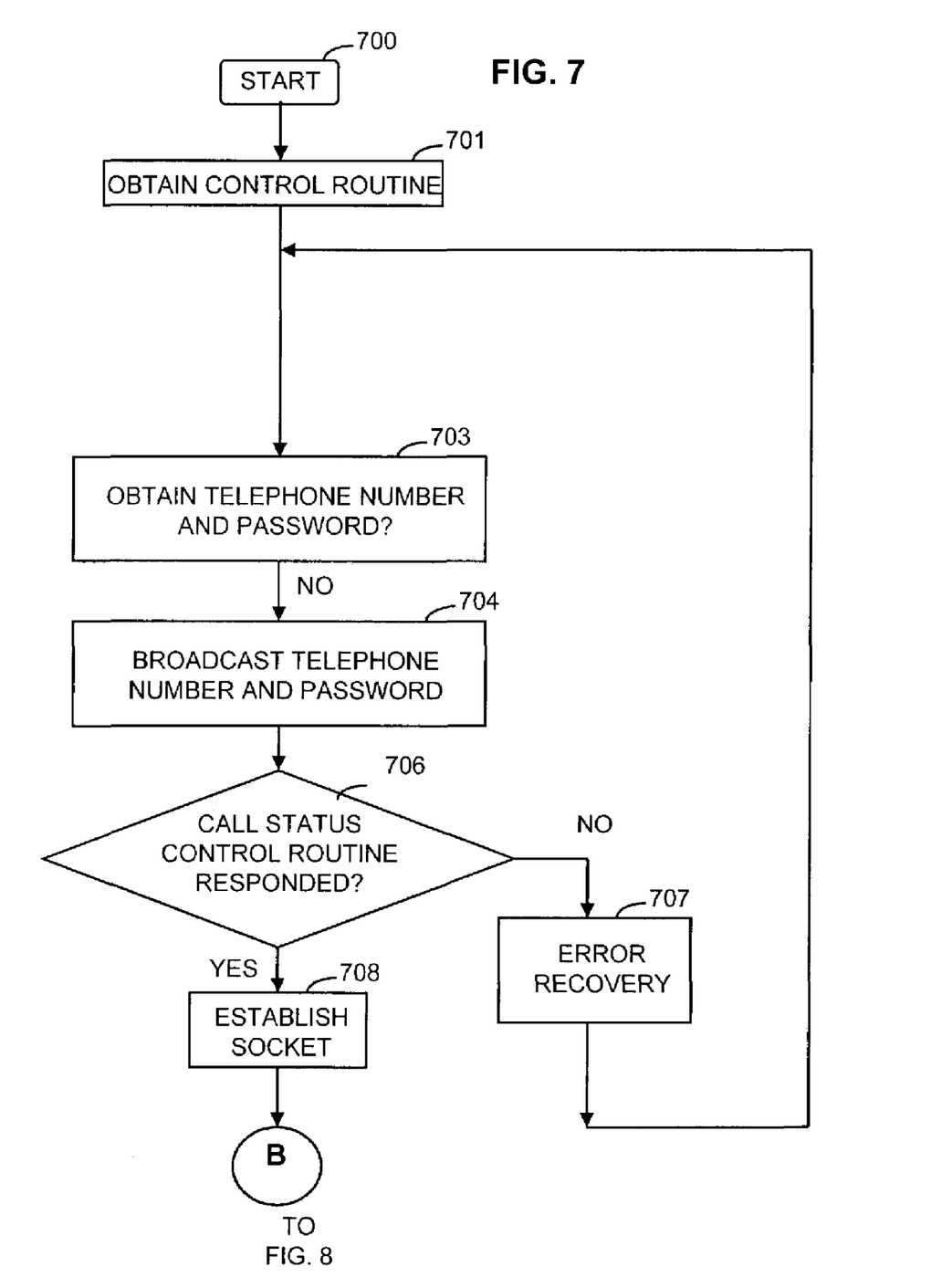
FIGS. 7-8 illustrate, in flowchart form, operations performed by an embodiment of WEB routines.
Figure 8:
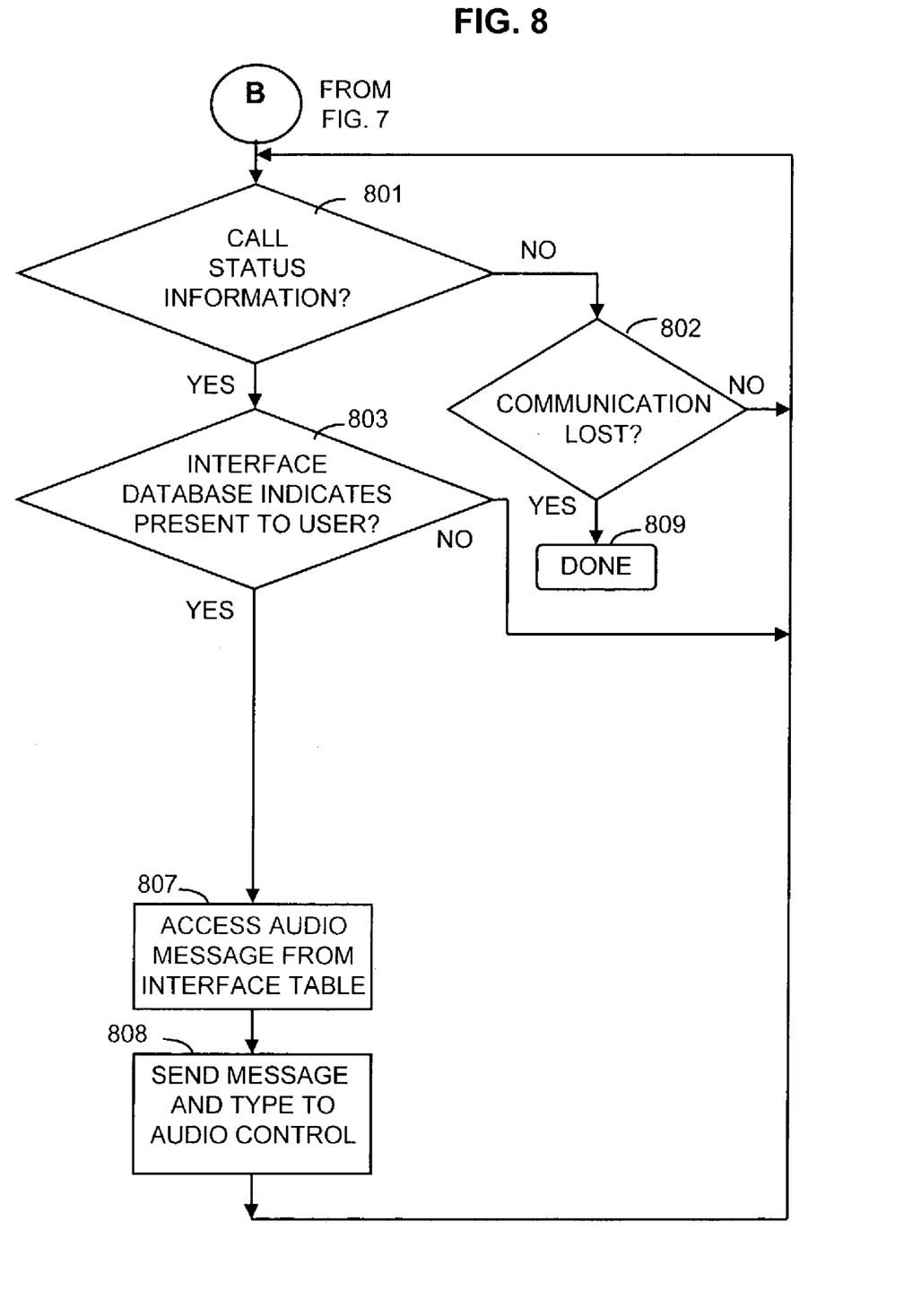

FIGS. 7-8 illustrate, in flowchart form, operations performed by one embodiment of a WEB routines such as WEB routines 118 of FIG. 1 where the WEB routines are receiving the call status information from an IP telephone set. After being started, in block 700, block 701 (executed by the WEB browser) obtains the control routine and interface database. After the control routine is obtained and executed, block 703 obtains the telephone number and password for the IP telephone set that is to be monitored. Block 703 may perform this operation by obtaining it from a server such as server 119. After execution of block 703, block 704 broadcasts the telephone number and password to all of the IP telephone sets.

After execution of block 704, control is transferred to decision block 706 which determines if an IP telephone set responded to the broadcasting of the telephone number and the password. One skilled in the art would readily realize that the telephone number and password could be encrypted so that it was not possible for a computer to fraudulently gain access to the control status information of an IP telephone set. If the answer in decision block 706 is no, control is transferred to block 707 which performs error recovery before transferring control back to block 703. If the answer is decision block 706 is yes, block 708 establishes a socket with the call status control routine before transferring control to decision block 801 of FIG. 8.

Decision block 801 determines if call status information has been received as a message from call status control routine. If the answer is no, decision block 802 determines if communication has been lost between the control routine and the call status control routine. If the answer is yes, operations are terminated in block 809. In addition to transferring control to block 809 upon communication being terminated between the control routine and the call status control routine, decision block 802 also is responsive to user input to terminate operations. If the answer is no in decision block 802, control is transferred back to decision block 801.

Returning to decision block 801, if the answer is yes, control is transferred to block 803 which accesses the interface database to determine if the particular call status information should be presented to the user. As is discussed in the aforementioned, incorporated U.S. patent application, the user or system administrator has the capability of determining which call status information will be presented to the user as well as how often a particular type of call status information must occur before an instance of the call status information is presented to the user. If the answer is no in decision block 803, control is transferred back to decision block 801. If the answer is yes in decision block 803, block 807 accesses the encoded audio message from the interface database along with the audio driver type that is to be utilized on the IP telephone set. Block 808 then sends a message that contains the encoded audio message and the audio driver type to the audio control routine before transferring control back to decision block 801.

When the operations of an IP telephone set are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The IP telephone set can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution system, apparatus, or device. For example, the computer-readable medium can be, but is not limited to, an electronic, magnetic, optical, electromagnetic, infrared, or semiconductor system, apparatus, or device. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

In an alternative embodiment, where IP telephone set is implemented in hardware, IP telephone set can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for providing status of station-specific telephony function information intended for visual presentation as audio information by a telecommunication set, comprising the steps of:

establishing by a first control application in the telecommunication set a first network connection with a second control application in the telecommunication set in response to a first message from the second control application;

transmitting by the first control application status of station-specific telephony function information intended for visual presentation to the second control application via the first network connection; and generating by the second control application audio status of station-specific telephony function information from the transmitted status of station-specific telephony function information intended for visual presentation.

2. The method of claim 1 further comprises the steps of receiving by a third control application in the telecommunication set the audio status of station-specific telephony function information from the second control application; and producing by the third control application the audio status of station-specific telephony function information to a user of the telecommunication set.

3. The method of claim 2 wherein the step of receiving comprises the steps of establishing by the third control application a second network connection with the second control application in response to a second message from the second control application; and receiving by the third control application the audio status of station-specific telephony function information from the second control application via the second network connection.

4. The method of claim 3 wherein the audio status of station-specific telephony function information is produced by a CODEC used for telecommunication voice information of telecommunication calls.

5. The method of claim 3 wherein the audio status of station-specific telephony function information is produced by an audio generator other than a CODEC used for telecommunication voice information of telecommunication calls.

6. The method of claim 3 wherein the network supports a protocol that allows for sockets and the step of establishing the second network connection comprises the step of setting up a socket between the second and third control applications.

7. The method of claim 1 wherein the network supports a protocol that allows for sockets and the step of establishing the first network connection comprises the step of setting up a socket between the first and second control applications.

8. The method of claim 1 further comprises the step of receiving by the first control application the status of station-specific telephony function information intended for visual presentation from a switching system via the network.

9. The method of claim 1 further comprises transmitting the network address of the telecommunication set to the second control application by the first control application in response to a telecommunication identification number of the telecommunication set being received on the network from the second control application.

10. The method of claim 1 further comprises the steps of accessing by a fourth control application the second control application from a remote unit; and
storing by the fourth control application the accessed second control application in the telecommunication set.

11. The method of claim 10 further comprises the steps of accessing by the fourth control application data defining the audio status of station-specific telephony function information from a remote unit; and
storing by the fourth control application the accessed data in the telecommunication set.

12. A computer-readable medium comprising computer-executable instructions stored in a telecommunication set for:
establishing by a first subset of the computer-executable instructions stored in the telecommunication set a first network connection with a second subset of the computer-executable instructions stored in the telecommunication set in response to a first message from the second control application; and
transmitting by the first subset of the computer-executable instructions status of station-specific telephony function information intended for visual presentation to the second subset of the computer-executable instructions via the first network connection; and
generating by the second subset of the computer-executable instructions audio status of station-specific telephony function information from the transmitted status of station-specific telephony function information intended for visual presentation.

13. The computer-readable medium of claim 12 further comprises receiving by a third subset of the computer-executable instructions stored in the telecommunication set the audio status of station-specific telephony function information from the second control application subset of the computer-executable instructions; and
producing by the third subset of the computer-executable instructions the audio status of station-specific telephony function information to a user of the telecommunication set.

14. The computer-readable medium of claim 13 wherein the receiving comprises establishing by the third subset of the computer-executable instructions a second network connection with the second subset of the computer-executable instructions in response to a second message from the second subset of the computer-executable instructions; and
receiving by the third subset of the computer-executable instructions the audio status of station-specific telephony function information from the second subset of the computer-executable instructions via the second network connection.

15. The computer-readable medium of claim 14 wherein the audio status of station-specific telephony function information is produced by a CODEC used for telecommunication voice information of telecommunication calls.

16. The computer-readable medium of claim 14 wherein the audio status of station-specific telephony function information is produced by an audio generator other than a CODEC used for telecommunication voice information of telecommunication calls.

17. The computer-readable medium of claim 14 wherein the network supports a protocol that allows for sockets and the establishing the second network connection comprises setting up a socket between the second and third subsets of the computer-executable instructions.

18. The computer-readable medium of claim 12 wherein the network supports a protocol that allows for sockets and the establishing the first network connection comprises setting up a socket between the first and second subsets of the computer-executable instructions.

19. The computer-readable medium of claim 12 further comprises receiving by the a first subset of the computer-executable instructions the status of station-specific telephony function information intended for visual presentation from a switching system via the network.

20. The computer-readable medium of claim 12 further comprises transmitting the network address of the telecommunication set to the second subset of the computer-executable instructions by the first control application subset of the computer-executable instructions in response to a telecommunication identification number of the telecommunication set being received on the network from the second control application subset of the computer-executable instructions.

21. The computer-readable medium of claim 12 further comprises accessing by a fourth control application the second subset of the computer-executable instructions from a remote unit; and
storing by the fourth control application the accessed second control application subset of the computer-executable instructions in the telecommunication set.

22. The computer-readable medium of claim 21 further comprises accessing by the fourth control application data defining the audio status of station-specific telephony function information from a remote unit; and
storing by the fourth control application the accessed data in the telecommunication set.

* * * * *